United States Patent [19]

Manzoni

[11] Patent Number: 4,812,615
[45] Date of Patent: Mar. 14, 1989

[54] ELECTRIC HEATING ARRANGEMENT FOR A HYGROMETRIC SENSOR OF AN AUTOMATICALLY CONTROLLED CIRCUIT

[75] Inventor: Bernard Manzoni, Saint-Claude, France

[73] Assignee: Societe Anonyme: Manzoni-Bouchot, France

[21] Appl. No.: 75,110

[22] Filed: Jul. 20, 1987

[30] Foreign Application Priority Data

Jul. 24, 1986 [FR] France .................. 8610768

[51] Int. Cl.$^4$ .............. H05B 1/02; H05B 3/00; B60S 1/08; H01L 7/00
[52] U.S. Cl. .................. 219/209; 15/250.12; 73/336.5; 219/201; 219/203; 338/35
[58] Field of Search .......... 219/203, 201, 209; 73/336.5; 338/35; 15/250.12

[56] References Cited

U.S. PATENT DOCUMENTS

| | | |
|---|---|---|
| 2,717,957 | 9/1955 | Ohlheiser ............... 73/336.5 X |
| 3,164,820 | 1/1965 | Hulett .................. 338/35 X |
| 3,282,097 | 11/1966 | Schmid et al. ............ 338/35 X |
| 3,649,898 | 3/1972 | Inoue . |
| 4,326,414 | 4/1982 | Terada et al. ............ 73/336.5 |
| 4,458,137 | 7/1984 | Kirkpatrick ............. 219/209 X |

FOREIGN PATENT DOCUMENTS

| | | |
|---|---|---|
| 2022823 | 3/1970 | Fed. Rep. of Germany . |
| 2255264 | 5/1974 | Fed. Rep. of Germany . |
| 2345546 | 3/1975 | Fed. Rep. of Germany . |
| 2630470 | 1/1978 | Fed. Rep. of Germany . |
| 2221045 | 10/1974 | France . |
| 2498137 | 7/1982 | France ............... 219/203 |
| 2555752 | 5/1985 | France ............... 219/203 |
| 60-76684 | 1/1985 | Japan . |
| 1101441 | 1/1968 | United Kingdom . |
| 1387436 | 3/1975 | United Kingdom . |

*Primary Examiner*—Anthony Bartis
*Attorney, Agent, or Firm*—Remy J. VanOphem

[57] ABSTRACT

An electronic circuit for automatically controlling an electrically operated device on a motor vehicle, such as windshield wiper, fog lights, etc., for aiding driving during inclement weather includes a hygrometer having an electrical resistor with a resistivity which changes with respect to humidity located on a support base heated by an electric resistive heater on the support base and connectable to a substantially constant voltage power source. A threshold temperature detector located in the support base proximate the electrical resistor is electrically connected in series with the resistive heater for regulating the electrical energy to the resistive heater to maintain the support base and electrical resistor below a predetermined temperature such that the hygrometric sensor is not damaged.

7 Claims, 1 Drawing Sheet

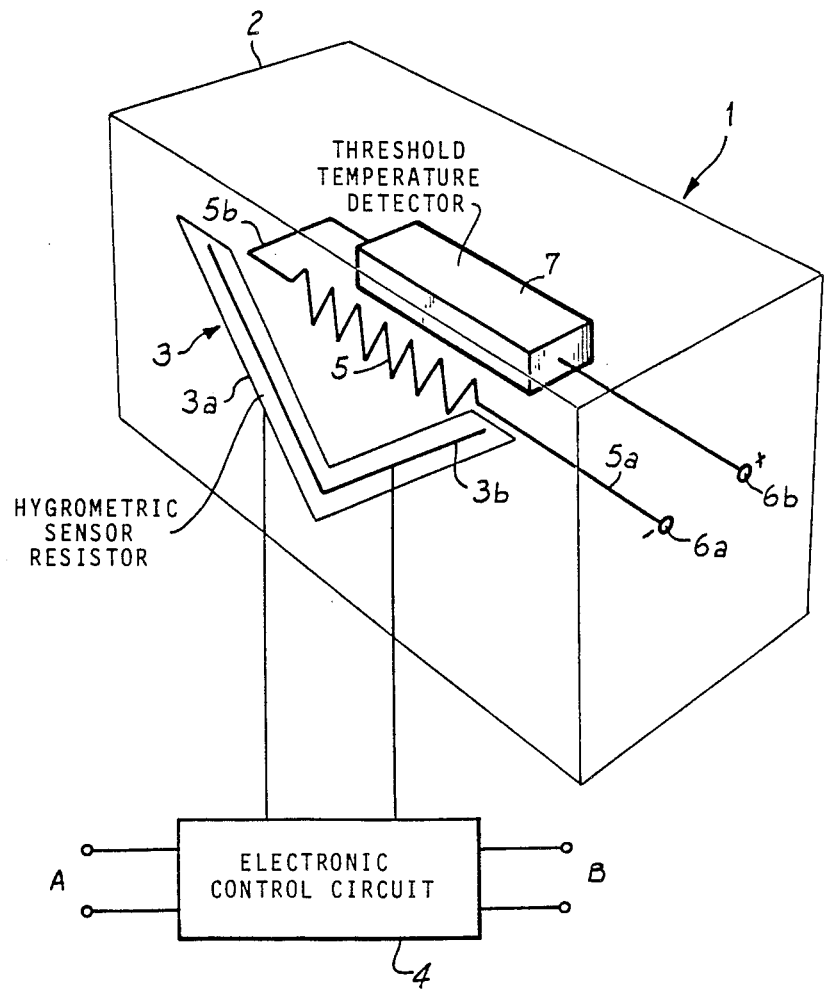

ELECTRIC HEATING ARRANGEMENT FOR A HYGROMETRIC SENSOR OF AN AUTOMATICALLY CONTROLLED CIRCUIT

BACKGROUND OF THE INVENTION

1. Field of the Invention

The present invention relates to a heating device for a hygrometric sensor for automatically controlling vehicle equipment, in particular windshield wipers.

2. Description of the Prior Art

French Utility Certificate No. FR-A-2 498 137 and French Pat. No. FR-A-2 555 752, in particular, disclose automatic controls of vehicle equipment, for example the windshield wipers. Such controls, set into action by the atmospheric elements to which the vehicles are exposed, must ensure operation of the windshield wipers, lighting of the low-beam or fog lights or, more generally, must ensure operation of the equipment for facilitating driving in bad weather.

The automatic controls of this type are known to be controlled by a hygrometric sensor constituted essentially by an electric resistor variable as a function of the degree of humidity due to the inclement weather to which the vehicle is exposed, for example fog or rain.

This hygrometric sensor, generally constituted by a printed circuit on a support made of plastic material, is mounted at the front of the vehicle in a region exposed directly to the ambient humidity, but precautions are taken to avoid it being reached by a stream of water flowing over the bodywork of the vehicle.

Furthermore, it is known that, for the automatic control to function suitably, it is necessary to ensure a permanent heating of the support of the hygrometric sensor. To that end, at least one electrical heating resistor is embedded in the support of the sensor.

In the case of the two known embodiments mentioned hereinabove, this heating resistor is generally switched on by means of an electrical voltage which varies as a function of the degree of humidity detected by the sensor. Prohibitive overheating of the support of the sensor, which would risk deteriorating it, is thus avoided.

However, the heating device which has just been described presents a drawback. If a vehicle has remained parked in a damp place, for example a garage, the sensor causes operation of the equipment when the driver starts up his vehicle, even if there is no humidity deposited on the windshield which would hinder driving. The various equipment controlled thereby, particularly the windshield wipers, continue to operate, sometimes for several minutes, until the support of the sensor is sufficiently heated and all dampness on the detector resistor has disappeared.

This drawback is due to the fact that the power of heating is lower as the rate of humidity detected is itself low, as is the case in a garage.

Utility Certificate No. FR-A-2 498 137 has certainly proposed using heating means independent of the degree of humidity and without any temperature monitoring. However, such a solution is unsatisfactory, as the heating resistor must still be such that there is no risk of deterioration of the support of the sensor, i.e. the heating will not be intense. The drawback set forth hereinabove, when a vehicle is started up in a sheltered but damp place, leads to unnecessary and relatively long operation of the equipment, and in particular of the windshield wipers.

SUMMARY OF THE INVENTION

It is an object of the present invention to overcome the drawback, which has just been set forth, of the known heating devices for a hygrometric sensor for automatically controlling certain equipment of a vehicle.

According to the invention, the heating resistor of the sensor is connected to the terminals of a constant voltage source when the engine of the vehicle is started up, but a threshold temperature detector is provided between one of the terminals of this source of voltage and the corresponding terminal of the sensor. The detector, for example of the bimetal type or the like, is disposed in the support of the sensor and in the vicinity of its humidity detector resistor, and it ensures cut-off of the supply circuit of the heating resistor when the temperature of the sensor attains a predetermined value.

As a result of this arrangement, it is possible to give the heating resistor of the sensor a sufficiently low value for the power of heating to be very high. When a vehicle having remained in a sheltered but damp place is started up, the sensor is very rapidly heated and the humidity which was possibly condensed thereon is eliminated without delay. Unnecessary operation of the equipment, particularly the windshield wipers, provoked by the engine of the vehicle being started up, stops before the driver has had the time to be appreciably disturbed thereby.

BRIEF DESCRIPTION OF THE DRAWING

The invention will be more readily understood on reading the following description with reference to the accompanying drawings, in which:

The sole view of the drawing shows a hygrometric sensor for controlling vehicle equipment such as windshield wipers, provided with a heating device according to the invention.

DETAILED DESCRIPTION OF THE PREFERRED EMBODIMENT

Referring now to the drawing, reference numeral 1 designates a sensor. It includes a support 2, generally constituted by a block of plastic material. On one of the faces of the latter is printed an electrical resistor 3 for detecting humidity, for example of the type described in Pat. No. FR-A-2 555 752. Two electrodes 3a and 3b of the detector resistor are connected to an electronic circuit for controlling the equipment A and B of a vehicle aiding driving in bad weather, this circuit being designated in general by reference 4. The electronic circuit has two input terminals A connected to a source of supply and two output terminals B connected to the motor for driving the windshield wipers or to a relay for lighting the lights, or to other appropriate equipment.

In the support 2 of the sensor is embedded a heating resistor 5 of which the terminals 5a and 5b are connected to a constant voltage source shown schematically by its terminals 6a and 6b preferably to be placed on one face of the support 2.

The heating resistor 5 is preferably located in the vicinity of the detector resistor 3 and a threshold temperature detector 7 is connected between its terminal 5b and the corresponding terminal 6b of the source of voltage. This detector is likewise placed in the vicinity of the detector resistor 3.

When the vehicle is moving in a zone of bad weather, the sensor controls the control circuit 4 under known conditions, as disclosed in particular by the Patents mentioned above.

In any case, and whatever the humidity covering the detector resistor 3, particularly after the vehicle has been parked in a damp place, the mean temperature of the sensor (support and detector resistor) cannot rise beyond a value determined by the characteristics of the threshold temperature detector 7. The latter in fact ensures cut-off of the supply circuit of the heating resistor 5 as soon as its own temperature reaches a determined value, possibly different from the mean temperature of the support 2.

What is claimed is:

1. A hygrometric sensor for automatically controlling electrically operated devices that are electrically connected to an electronic control circuit, comprising:
    a support base;
    an electrical resistor located on said support base, said electrical resistor have resistivity which changes with respect to changes in humidity, said electrical resistor being electrically connectable to the electronic control circuit of an electrically operated device;
    an electrically operated resistive heater in said support base for heating said support base and said electrical resistor, said electrically operated resistive heater being connectable to a source of electrical energy having substantially constant voltage; and
    a threshold temperature detector located in said support base proximate said electrical resistor, said threshold temperature detector being electrically connected in series with said electrically operated resistive heater for regulating said electrical energy to said electrically operated resistive heater, said threshold temperature detector regulating said electrical energy to said electrically operated resistive heater to maintain said support base and said electrical resistor below a predetermined temperature such that said hygrometric sensor is not damaged by heat produced by said electrical resistor.

2. The hygrometric sensor of claim 1, wherein said threshold temperature detector cuts off said electrical energy to said electrically operated resistive heater when said support base attains said predetermined temperature.

3. A hygrometric sensor and electronic circuit automatically controlling an electrically operated devices, comprising:
    a support base;
    an electrical resistor located on said support base, said electrical resistor having resistivity which changes with respect to changes in humidity;
    an electronic control circuit electrically connected to said electrical resistor, said electronic control circuit being electrically connectable to an electrically operated device;
    an electrically operated resistive heater in said support base for heating said support base and said electrical resistor, said electrically operated resistive heater being connectable to a source of electrical energy having substantially constant voltage; and
    a threshold temperature detector located in said support base proximate said electrical resistor, said threshold temperature detector being electrically connected in series with said electrically operated resistive heater for regulating said electrical energy to said electrically operated resistive heater, said threshold temperature detector regulating said electrical energy to said electrically operated resistive heater to maintain said support base and said electrical resistor below a predetermined temperature such that said hygrometric sensor is not damaged by heat produced by said electrical resistor.

4. The hygrometric sensor and electronic circuit of claim 3, wherein said threshold temperature detector cuts off electrical energy to said electrically operated resistive heater when said support base attains said predetermined temperature.

5. The hygrometric sensor and electronic circuit of claim 3, wherein said electrically operated device comprises an electrical device on a motor vehicle for aiding driving during inclement weather.

6. The hygrometric sensor and electronic circuit of claim 4, wherein said electrically operated device comprises windshield wipers.

7. The hygrometric sensor and electronic circuit of claim 5, wherein said electrically operated device comprises vehicle lights.

* * * * *